United States Patent
Zha et al.

(10) Patent No.: US 8,652,331 B2
(45) Date of Patent: Feb. 18, 2014

(54) MEMBRANE SYSTEM BACKWASH ENERGY EFFICIENCY

(75) Inventors: Fufang Zha, West Ryde (AU); Zhiyi Cao, Lidcombe (AU)

(73) Assignee: Siemens Water Technologies LLC, Alpharetta, GA (US)

( * ) Notice: Subject to any disclaimer, the term of this patent is extended or adjusted under 35 U.S.C. 154(b) by 79 days.

(21) Appl. No.: 13/059,283

(22) PCT Filed: Aug. 17, 2009

(86) PCT No.: PCT/US2009/053979
§ 371 (c)(1),
(2), (4) Date: Feb. 16, 2011

(87) PCT Pub. No.: WO2010/021959
PCT Pub. Date: Feb. 25, 2010

(65) Prior Publication Data
US 2011/0139715 A1    Jun. 16, 2011

(30) Foreign Application Priority Data

Aug. 20, 2008   (AU) .................................. 2008904279

(51) Int. Cl.
| B01D 65/02 | (2006.01) |
| B01D 61/20 | (2006.01) |
| B01D 61/22 | (2006.01) |

(52) U.S. Cl.
USPC ...... 210/636; 210/650; 210/108; 210/321.69; 210/410; 210/411; 210/425

(58) Field of Classification Search
USPC ............ 210/636, 650, 108, 321.69, 410, 411, 210/425
See application file for complete search history.

(56) References Cited

U.S. PATENT DOCUMENTS

| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |

(Continued)

FOREIGN PATENT DOCUMENTS

JP    2001212587 A    8/2001

OTHER PUBLICATIONS

Supplementary European Search Report dated Feb. 8, 2013 for Application No. EP 09 80 8651 (6 pages).

*Primary Examiner* — David C Mellon

(57) ABSTRACT

A method of backwashing a membrane filtration system comprising at least one permeable membrane, preferably a hollow fiber membrane, the method comprising the step of applying a pressurized gas at a variable pressure to permeate remaining present in the system when filtration process is stopped or suspended to provide liquid for backwashing pores of the permeable membrane during a backwashing process. Also provided are methods of filtering solids from a liquid suspension using alternating liquid backwash pressures.

16 Claims, 1 Drawing Sheet

(56) References Cited

U.S. PATENT DOCUMENTS

| | | |
|---|---|---|
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |

(56) References Cited

U.S. PATENT DOCUMENTS

| | | |
|---|---|---|
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| 5,783,083 A | 7/1998 | Henshaw et al. |
| D396,726 S | 8/1998 | Sadr et al. |
| 5,814,234 A | 9/1998 | Bower et al. |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,071,404 A | 6/2000 | Tsui |

(56) References Cited

U.S. PATENT DOCUMENTS

| | | |
|---|---|---|
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,162,020 A | 12/2000 | Kondo |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Chisholm et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |

(56) References Cited

U.S. PATENT DOCUMENTS

| | | |
|---|---|---|
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007207 A1 | 1/2007 | Mahendran et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203016 A1 | 8/2008 | Johnson et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0056522 A1 | 3/2011 | Zauner et al. |

(56) References Cited

U.S. PATENT DOCUMENTS

| | | |
|---|---|---|
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0192783 A1 | 8/2011 | Cox et al. |
| 2011/0198283 A1 | 8/2011 | Zha et al. |
| 2012/0074053 A1 | 3/2012 | Collignon et al. |
| 2012/0091602 A1 | 4/2012 | Cumin et al. |
| 2012/0187044 A1 | 7/2012 | Zha et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0153496 A1 | 6/2013 | Zha et al. |

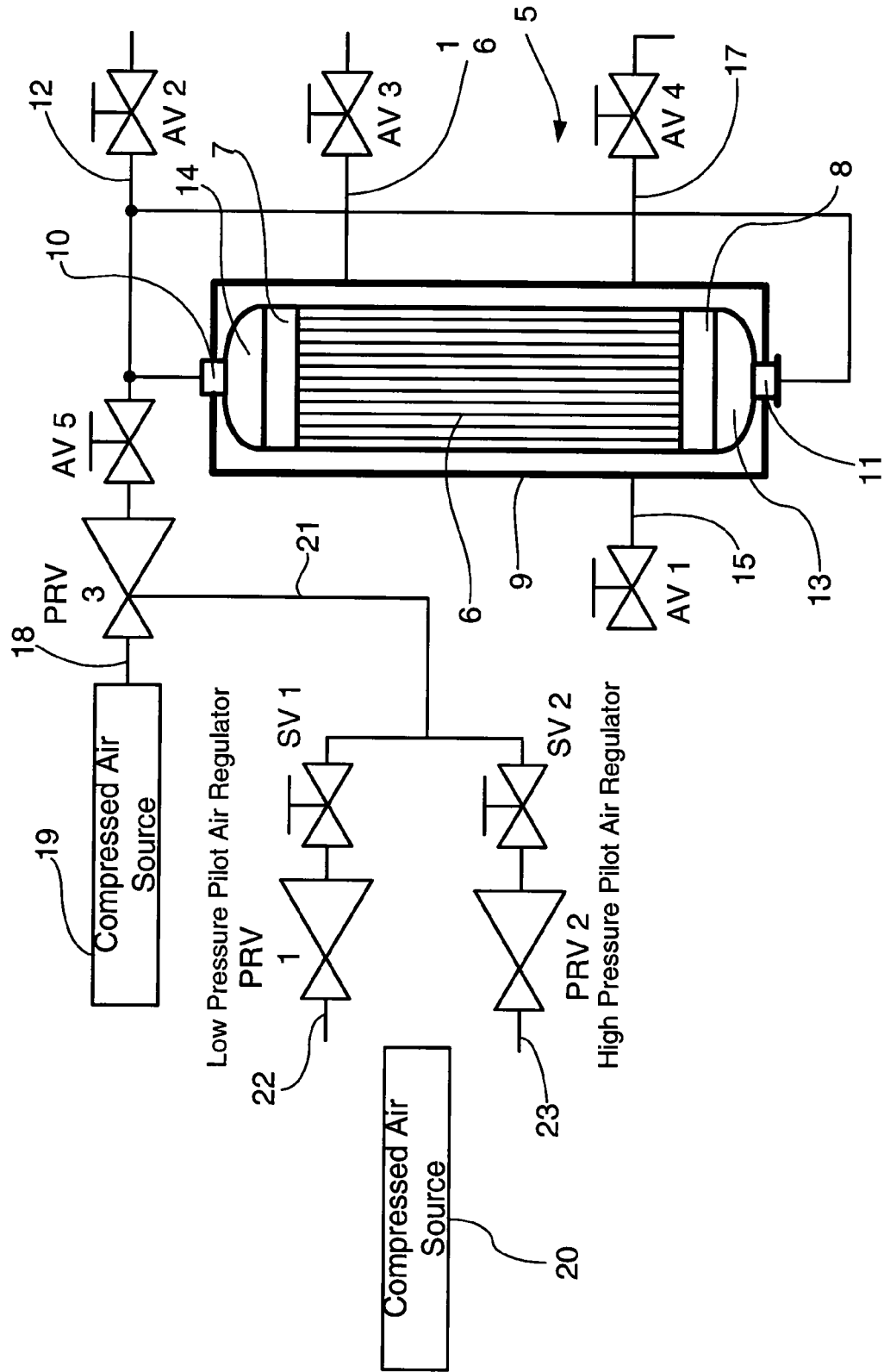

MEMBRANE SYSTEM BACKWASH ENERGY EFFICIENCY

TECHNICAL FIELD

The present invention relates to membrane filtration systems and more particularly to improved methods and apparatus for cleaning the membranes used in such systems.

BACKGROUND OF THE INVENTION

Membrane cleaning is a key step to the success of any ongoing membrane filtration process. Without regular cleaning the membranes become clogged with impurities and decrease in efficiency until they are eventually rendered inoperative. Different physical membrane cleaning strategies have been proposed and published. A summary of some typical methods is described below.

1. Scrubbing membranes with gas bubbles. This method was first published by Yamamoto et al. (Water Science Technology, Vol. 2, pages 43-54; 1989) and has been widely used in low-pressure filtration processes. The shear force created by gas bubbles removes fouling materials on the membrane surface, but does little to reduce the fouling within the membrane pores.

2. Backwash or back pulsing method. This method uses a reversed flow of fluid (relative to the filtration flow direction) through the membrane pores to dislodge fouling materials therefrom. Either gas or liquid or a combination thereof can be used as a fluid in the reverse backwash.

In PCT Publication WO 03/059495, Bartels et al. describe a backwash technique where the hollow fibre membranes are pressurized with a gas on a feed side at a specified time during the backwash. They describe the periodic use of such backwashes to effectively remove fouling components from the hollow fibre membranes.

To carry out a liquid backwash, typically a liquid pump and a liquid holding tank are required. The pump delivers a permeate flow in a reverse direction to the normal filtration flow through the membrane pores to clean accumulated solids and impurities from the membranes pores.

In some pressurised filtration systems it has been found advantageous to use a gas pushed liquid backwash for the pressurized system which provides improved efficiency without compromising backwash performance. A gas pushed liquid backwash is generally achieved by sending compressed gas, typically air, to the lumen side of a hollow fibre membrane and pushing the filtrate remaining in the lumen at the end of a filtration cycle to shell or feed side of membrane wall. The backwash air pressure is typically set to more than 150 kPa. It is desirable to keep the air pressure required to a minimum in order to reduce the cost and energy requirements for production of the pressurised air.

Any discussion of the prior art throughout the specification should in no way be considered as an admission that such prior art is widely known or forms part of the common general knowledge in the field.

DISCLOSURE OF THE INVENTION

It is an object of the present invention to overcome or ameliorate at least one of the disadvantages of the prior art, or to provide a useful alternative. According to a first aspect, the invention provides a method of backwashing a membrane filtration system comprising at least one permeable hollow membrane, the method comprising the step of applying a pressurised gas at a variable pressure to permeate remaining present in the system when filtration process is stopped or suspended to provide liquid for backwashing pores of the permeable hollow membrane during a backwashing process.

According to a second aspect, the invention provides a method of filtering solids from a liquid suspension comprising the steps of:
(i) providing a pressure differential across a wall of a permeable hollow membrane immersed in the liquid suspension, the liquid suspension being applied to an outer surface of the permeable hollow membrane to induce and sustain filtration through the wall of permeable hollow membrane wherein:
  (a) at least part of the liquid suspension passes through the wall of the membrane to be drawn off as permeate from a lumen of the permeable hollow membrane; and
  (b) at least some of the solids are retained on or in the permeable hollow membrane or otherwise as suspended solids within the liquid surrounding the permeable hollow membrane; and
(ii) periodically backwashing membrane pores using permeate remaining within the permeable hollow membrane lumen and/or a filtrate manifold where present by applying a gas at a variable pressure below bubble point of the permeable hollow membrane to the permeate to displace at least some of the permeate within the lumen and/or filtrate manifold through pores of the permeable hollow membrane resulting in removal of the solids retained on or in the permeable hollow membrane.

According to a third aspect, the invention provides a method of filtering solids from a liquid suspension in a filtration system comprising:
(i) providing a pressure differential across a wall of a permeable hollow membrane having a liquid suspension applied to a lumen surface of the permeable hollow membrane to induce and sustain filtration through the wall of the permeable hollow membrane wherein:
  (a) at least part of the liquid suspension passes through the wall of the permeable hollow membrane to be drawn off as permeate from an outer surface of the permeable hollow membrane; and
  (b) at least some solids are retained on or in the permeable hollow membrane or otherwise as suspended solids within the permeable hollow membrane;
(ii) stopping or suspending the filtration process; and
(iii) periodically backwashing pores of the permeable hollow membrane using permeate remaining in the filtration system after the suspension of the filtration process by applying a gas at a variable pressure below bubble point of the permeable hollow membrane to the permeate to displace at least some of the permeate through pores of the permeable hollow membrane resulting in removal of the solids retained on or in the permeable hollow membrane.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The gas pressure is preferably varied between a first and a second value, the first value being higher than the second value. For preference the first and second pressure values are determined on the basis of a measurable membrane characteristic such as membrane permeability or membrane filter resistance.

Preferably, the first value gas pressure is used when membrane permeability is at or below a first predetermined value and the second value gas pressure is used when membrane permeability is at or above a second predetermined value.

Preferably, the first value gas pressure is used when membrane resistance is at or above a first predetermined value and the second value gas pressure is used when the membrane resistance is at or below a second predetermined value.

The first and second predetermined values may be different values or they may be the same value.

The gas pressure may be continuously varied, cycled or alternated between the first and second values The solids are preferably removed into bulk liquid surrounding the membranes during the backwashing step.

The permeable hollow membrane is preferably a permeable polymeric hollow fibre membrane. Preferably, a number of permeable polymeric hollow fibre membranes are bundled and potted into a module in parallel fashion. The lumens of the hollow fibres are preferably in fluid communication with a filter manifold.

The membrane filtration system may be a single fibre, a single module, a plurality of modules or a single module within a plurality of modules.

Preferably a plurality of hollow fibre membrane modules is included in the filtration system.

In certain alternative embodiments, the membrane filtration system is a pressurised membrane filtration system.

In other alternative embodiments, the membrane filtration system is a submerged membrane filtration system.

In further alternative embodiments, the membrane is not necessarily a hollow fibre membrane, but can be for example a flat sheet.

In another aspect the invention also provides a method of backwashing a membrane filtration system comprising at least one permeable membrane, the method comprising the step of applying variable pressure to permeate remaining present in the system when filtration process is stopped or suspended to provide liquid for backwashing pores of the permeable membrane during a backwashing process.

Variable pressure may be applied by applying gas at variable pressure to the permeate or by varying pumping speed of the permeate.

The invention also provides a method of filtering solids from a liquid suspension comprising the steps of:

(i) providing a pressure differential across a wall of a permeable membrane having a liquid suspension being applied to a first side of the permeable membrane to induce and sustain filtration through the wall of the permeable membrane wherein:

(a) at least part of the liquid suspension passes through the wall of the permeable membrane to be drawn off as permeate from a second side of the permeable membrane; and (b) at least some of the solids are retained on or in the permeable membrane or otherwise as suspended solids within the liquid surrounding the first side of the permeable membrane; and (ii) periodically backwashing pores of the permeable membrane using permeate remaining on the second side of the permeable membrane after he suspension of the filtration process by applying variable pressure below bubble point of the permeable membrane to the permeate to displace at least some of the permeate from the second side of the permeable membrane through pores of the permeable membrane resulting in removal of the solids retained on or in the permeable membrane.

Variable pressure may be applied by applying gas at variable pressure to the permeate or by varying pumping speed of the permeate.

The invention also provides a method of backwashing a membrane filtration system comprising at least one permeable membrane, the method comprising the step of applying a pressurised gas at a variable pressure to permeate remaining present in the system when filtration process is stopped or suspended to provide liquid for backwashing pores of the permeable membrane during a backwashing process.

The invention also provides a method of filtering solids from a liquid suspension comprising the steps of:

(i) providing a pressure differential across a wall of a permeable membrane having a liquid suspension being applied to a first side of the permeable membrane to induce and sustain filtration through the wall of the permeable membrane wherein:

(a) at least part of the liquid suspension passes through the wall of the permeable membrane to be drawn off as permeate from a second side of the permeable membrane; and (b) at least some of the solids are retained on or in the permeable membrane or otherwise as suspended solids within the liquid surrounding the first side of the permeable membrane; and (ii) periodically backwashing pores of the permeable membrane using permeate remaining on the second side of the permeable membrane after he suspension of the filtration process by applying a gas at a variable pressure below bubble point of the permeable membrane to the permeate to displace at least some of the permeate from the second side of the permeable membrane through pores of the permeable membrane resulting in removal of the solids retained on or in the permeable membrane.

BRIEF DESCRIPTION OF THE DRAWING

A preferred embodiment of the invention will now be described, by way of example only, with reference to the accompanying drawing in which FIG. 1 shows a schematic diagram of a backwash system for a filtration system according to one embodiment of the invention.

PREFERRED EMBODIMENTS OF THE INVENTION

Referring to FIG. 1 there is shown one embodiment of a gas pushed liquid backwash system according the invention. The system comprises a filtration module 5 having hollow fibre membranes 6 supported by and extending generally vertically between upper and lower headers 7 and 8. The module 5 is positioned in a pressurised feed vessel 9. In this embodiment filtrate is withdrawn from both ends of the hollow fibres membranes 6 through upper and lower ports 10 and 11, however, it will be appreciated that, in some embodiments, filtrate may only be withdrawn from one end of the module. The upper and lower headers 7 and 8 are provided with respective filtrate collection chambers 14 and 13 connected to a filtrate removal line 12 via the upper and lower ports 10 and 11, respectively. The filtrate removal line 12 is controlled by valve AV2. Feed liquid is supplied through feed line 15 under the control of valve AV1. An upper backwash line 16 provides for depressurisation of the feed vessel 9 under control of valve AV3. Waste containing liquid is removed through waste removal line 17 under the control of valve AV4.

As shown in FIG. 1, backwash gas, typically air, is supplied through gas pressure regulator PRV3 and backwash gas control valve AV5. PRV3 is pilot controlled gas regulator connected via gas line 18 to a source of pressurised gas 19. The gas regulator PRV3 is sized to provide sufficient backwash gas flow at a maximum pressure set point. The gas regulator PRV3 accepts the pressure set point by either gas regulator valve PRV1 or PRV2 via associated respective control valves SV1 and SV2, and gas control line 21. Gas regulator PRV1 is set to a low pressure ranging from about 70-120 kPa while gas regulator valve PRV2 is set to a high pressure ranging from about 150 to 250 kPa. Each gas regulator PRV1 and PRV2 is connected via gas lines 22 and 23 to a source of pressurised gas 20. It will be appreciated the sources of pressurised gas 19 and 20 may be the same source.

The various controllable valves employed in the system are controlled by a programmable logic controller (PLC) (not shown).

Before the liquid backwash is commenced, the PLC examines the measured membrane permeability and determines the backwash gas pressure required. If the membrane permeability is above a set value stored in the PLC, valve SV1 is opened and pilot controlled gas regulator PRV3 is set to a lower backwash gas pressure. If the membrane permeability is below a set value stored in the PLC, valve SV2 is opened and PRV3 is set to a higher backwash gas pressure. The backwash gas pressure can be any pressure between the upper and lower limits.

Alternatively, to strengthen the liquid backwash performance at high membrane permeability conditions, the liquid backwash can be set to alternate between high and low pressure backwash by alternating the gas pressure applied to the backwash liquid. For example, after one or several filtration cycles with low pressure backwash(es), one or several filtration cycles with high pressure backwash(es) are carried out. After the filtration cycle(s) with high pressure backwash(es) are completed, filtration cycles with low pressure backwash(es) resume.

Alternatively, the membrane filter resistance increase may be measured in the PLC and used to enable a high-pressure liquid backwash. When the filter resistance increase in a filtration cycle is higher than the preset value in the PLC, SV2 is activated during a backwash and high gas pressure is supplied to the system for a high-pressure liquid backwash.

In another operational variation, filter resistances at the beginning of a filtration cycle may be recorded by the PLC or other device and compared over several filtration cycles. If the net increase of filter resistance over a predetermined number of filtration cycles is larger than a set point stored in the PLC, the system will switch to provide a high-pressure liquid backwash. Once the net increase of filter resistance drops below a set point stored in the PLC, the system switches back to a low-pressure liquid backwash.

In the following example, the operation of a 6×120 module pressurized membrane plant was analysed. In this example, the plant cleaning interval was set to 35 days. The gas pressure for a liquid backwash was set to 100 kPa for the first 23 days of operation and 200 kPa for the last 12 days. Table 1 shows the comparison results.

From the comparison, it can be seen that, in this example, 21.8% of gas used for the gas pushed liquid backwash can be saved by alternating the liquid backwash pressure.

Although the present invention is specifically exemplified with respect to pressurised systems, it can be readily adapted for use in submerged systems. These are systems which involve the use of a liquid backwash rather than a gas backwash. The liquid backwash involves pushing clean (usually filtered) liquid back through the pores to dislodge foulant.

Liquid backwashes are typically either air pushed or pumped. An air pushed liquid backwash would be similar to the scheme shown in FIG. 1 with the exception that gas is used to force filtrate in a reverse direction. The upper and lower pressures and liquid backwash pressure are controlled by the corresponding gas pressures which are controlled in turn by the PLC.

A pumped backwash would also be able to be used to achieve a similar result. In that case, the filtrate is pumped directly back through the membrane to dislodge foulant. The upper and lower pressures and liquid backwash pressure are controlled by the speed of the pumps which are controlled in turn by the PLC.

The results obtained so far suggest that long term membrane performance will not be compromised by alternating the backwash pressure. By using the method of the present invention, long intervals (>30 days) between cleaning in place (CIP) events can be achieved.

It will be appreciated that further embodiments and exemplifications of the invention are possible without departing from the spirit or scope of the invention described.

TABLE 1

|  | Case 1 Alternating Liquid Backwash Pressure | Case 2 Constant Backwash Pressure |
| --- | --- | --- |
| Number of modules | 120 | |
| Number of Skids | 6 | |
| Backwash interval (mins) | 30 | |
| Number of backwashes per day per module | 40 | |
| Number of backwashes per day | 240 | |
| Backwash pressure at low pressure (kPa) | 100 | 0 |
| Number of days of BW at low pressure | 23 | 0 |
| Backwash pressure at high pressure (kPa) | 200 | 200 |
| Number of days of BW at high pressure | 12 | 35 |
| FAD air usage per backwash (L) (low pressure) | 1194 | |
| FAD air usage per day ($m^3$) (low pressure) | 286.6 | |
| FAD air usage per day ($m^3$) (high pressure) | 1788 | 1788 |
| FAD air usage per day ($m^3$) (high pressure) | 429 | 429 |
| Total Air consumption per CDP cycle ($m^3$ FAD) | 11741 | 15020 |
| Number of CIP's per year | 11 | 11 |
| Yearly air consumption | 129151 | 165222 |
| Yearly FAD air saving ($m^3$) | 36071 | |
| Yearly FAD air saving (%) | 21.8% | |

The claims defining the invention are as follows:

1. A method of filtering solids from a liquid suspension in a filtration system comprising:
   performing a filtration process including providing a pressure differential across a wall of a permeable hollow membrane to induce and sustain filtration through the wall of the permeable hollow membrane;
   suspending the filtration process; and
   periodically backwashing pores of the permeable hollow membrane using permeate remaining in the filtration system after suspending the filtration process, the backwashing of the pores dislodging fouling materials therefrom, the backwashing of the pores including:
   measuring a characteristic of the permeable hollow membrane, the characteristic of the permeable hollow membrane being one of membrane permeability, membrane resistance, and an increase in membrane resistance over a filtration cycle;
   making a determination of a gas pressure at which to apply backwash gas to the permeate remaining in the filtration system after suspending the filtration process, the determination made responsive to the measured characteristic of the permeable hollow membrane, the gas pressure being one of a high gas pressure below the bubble point of the permeable hollow membrane and a low gas pressure below the bubble point of the permeable hollow membrane, the low gas pressure being lower than the high gas pressure; and applying the backwash gas at the determined gas pressure to the permeate remaining in the filtration system after suspending the filtration process.

2. The method of claim 1, wherein the high gas pressure is used when membrane permeability is at or below a first predetermined value and the low gas pressure is used when membrane permeability is at or above a second predetermined value.

3. The method of claim 1, wherein the high gas pressure is used when membrane resistance is at or above a first predetermined value and the low gas pressure is used when the membrane resistance is at or below a second predetermined value.

4. The method of claim 2, wherein the first predetermined value and the second predetermined value are different.

5. The method of claim 2, wherein the first predetermined value and the second predetermined value are the same.

6. The method of claim 1, wherein the gas pressure is continuously varied between the high gas pressure and the low gas pressure.

7. The method of claim 1, wherein the gas pressure is alternated between the high gas pressure and the low gas pressure.

8. The method of claim 1, wherein at least some solids are removed into bulk liquid surrounding the membranes during backwashing the pores of the permeable hollow membrane.

9. The method of claim 1, including a plurality of membrane modules in the filtration system.

10. The method of claim 1, including a plurality of hollow fibre membrane modules in the filtration system.

11. The method of claim 9, wherein the filtration system is a pressurised membrane filtration system.

12. The method of claim 9, wherein the filtration system is a submerged membrane filtration system.

13. A method of filtering solids from a liquid suspension in a filtration system comprising:

performing a filtration process including providing a pressure differential across a wall of a permeable hollow membrane to induce and sustain filtration through the wall of the permeable hollow membrane;

suspending the filtration process; and periodically backwashing pores of the permeable hollow membrane using permeate remaining in the filtration system after suspending the filtration process, the backwashing of the pores including:

measuring a net increase in membrane resistance of the permeable hollow membrane over several filtration cycles;

making a determination of a gas pressure at which to apply backwash gas to the permeate remaining in the filtration system after suspending the filtration process, the determination made responsive to the measured net increase in membrane resistance of the permeable hollow membrane, the gas pressure being one of a high gas pressure below the bubble point of the permeable hollow membrane and a low gas pressure below the bubble point of the permeable hollow membrane, the low gas pressure being lower than the high gas pressure; and applying the backwash gas at the determined gas pressure to the permeate remaining in the filtration system after suspending the filtration process.

14. The method of claim 13, wherein the backwash gas is applied at the high gas pressure from a first gas regulator valve and the backwash gas is applied at the low gas pressure from a second gas regulator valve.

15. The method of claim 13, further comprising alternating between applying the backwash gas at the high gas pressure to the permeate and applying the backwash gas at the low gas pressure to the permeate.

16. The method of claim 13, wherein the backwash gas is applied to the permeate at the high gas pressure if the net increase in membrane resistance over the several filtration cycles is higher than a first set point and the backwash gas is applied to the permeate at the low gas pressure if the net increase in membrane resistance is below a second set point.

* * * * *